Sept. 24, 1957 L. FOX 2,807,034
HONEYCOMB UNCAPPING MACHINE
Filed Jan. 13, 1956 2 Sheets-Sheet 1

INVENTOR.
LLOYD FOX
BY
McMorrow, Berman & Davidson
ATTORNEYS

Sept. 24, 1957 L. FOX 2,807,034
HONEYCOMB UNCAPPING MACHINE
Filed Jan. 13, 1956 2 Sheets-Sheet 2
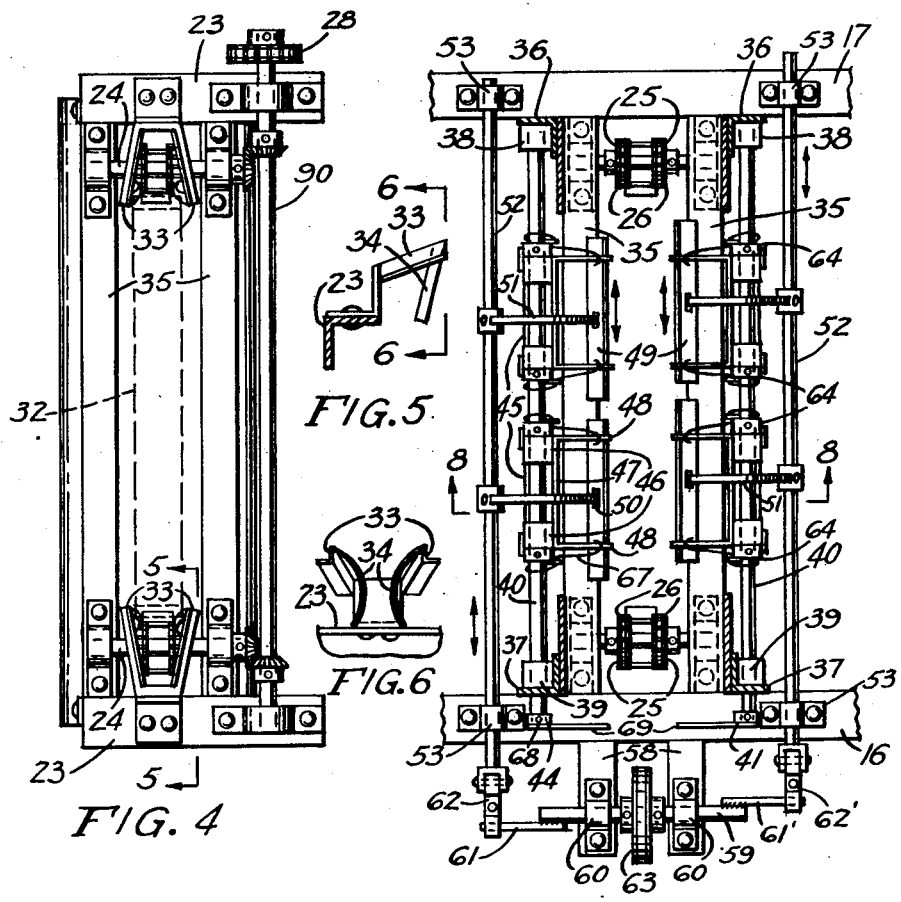
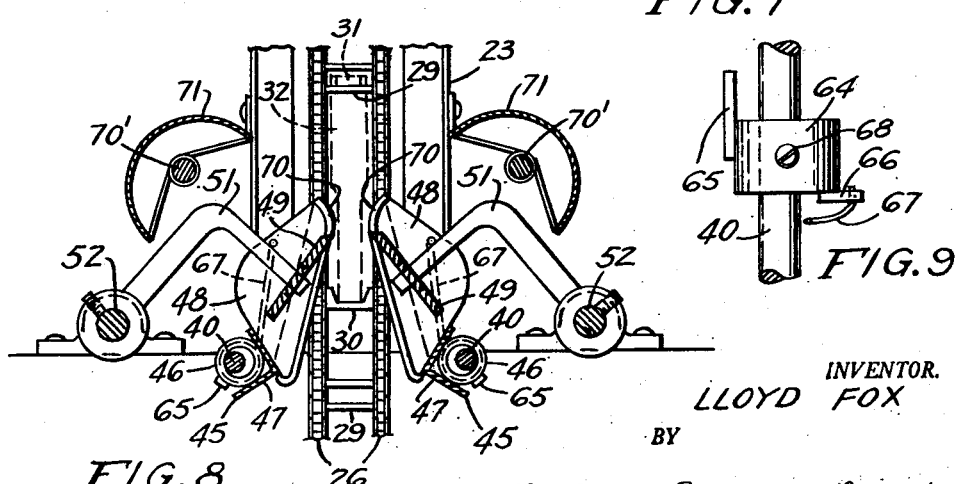
INVENTOR.
LLOYD FOX
BY
McMorrow, Berman & Davidson
ATTORNEYS

2,807,034
HONEYCOMB UNCAPPING MACHINE

Lloyd Fox, Sacramento, Calif.

Application January 13, 1956, Serial No. 558,992

4 Claims. (Cl. 6—12)

This invention relates to honeycomb processing apparatus, and more particularly to a machine for removing the wax end cappings from honeycomb frames.

A main object of the invention is to provide a novel and improved automatic machine for removing the wax end cappings from honeycomb frames, said machine being relatively simple in construction, being easy to operate, and greatly reducing the amount of human supervision and labor required in the process of uncapping honeycomb frames and collecting the honey therefrom.

A further object of the invention is to provide an improved honeycomb uncapping machine which involves relatively simple components, which is durable in construction, which is easy to clean, which is readily adjustable in accordance with the size of the honeycomb frames to be handled, and which efficiently empties and collects the honey from the honeycomb frames, utilizing the honey for lubrication of the machine.

Further objects and advantages of the invention will become apparent from the following description and claims, and from the accompanying drawings, wherein:

Figure 4 is an enlarged horizontal cross sectional detail view taken on the line 4—4 of Figure 2.

Figure 5 is an enlarged cross sectional detail view taken on the line 5—5 of Figure 4.

Figure 6 is an elevational detail view taken on the line 6—6 of Figure 5.

Figure 7 is an enlarged horizontal cross sectional view taken on the line 7—7 of Figure 2.

Figure 8 is a fragmentary vertical cross sectional view taken on the line 8—8 of Figure 7.

Figure 9 is an enlarged top view of a fragmentary portion of the shaft for the knife guide supporting means employed in the honeycomb uncapping apparatus of Figures 1 to 8, and showing one of the spring anchoring collars employed thereon.

Figure 1:
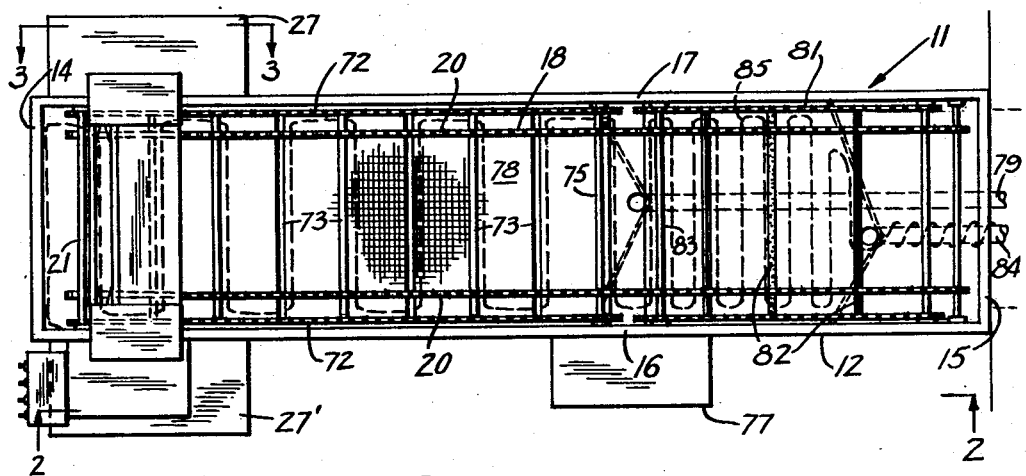
Figure 1 is a top plan view of an improved honeycomb uncapping machine constructed in accordance with the present invention.

Referring to the drawings, the improved honeycomb uncapping machine is designated generally at 11 and comprises a tank 12 of substantial length having a sloping bottom wall 13 which is inclined downwardly and rearwardly from the forward end of the tank, the forward end wall thereof being designated at 14. The rear end wall of the tank is shown at 15, and the vertical longitudinal walls are designated respectively at 16 and 17.

Designated at 18 is a longitudinal belt conveyor which is mounted in the upper portion of the tank 12 and which is inclined upwardly and rearwardly towards a receiving platform 19 mounted on the rear end of the tank above the rear end wall 15. The belt conveyor 18 comprises a pair of endless sprocket chains 20 suitably supported in the upper portion of tank 12 and having a driving sprocket shaft 21 journaled transversely in the forward end of the tank 12, the shaft 21 being driven by a motor 22 through suitable pulleys and gearing. As will be presently described, the conveyor 18 is adapted to receive uncapped honeycomb frames and to convey said honeycomb frames rearwardly toward the receiving platform 19.

Mounted on the opposite sides of the tank adjacent the forward end thereof and rising above the forward end of the longitudinal conveyor 18 are respective upstanding supports 23, 23 on the upper ends of which are journaled respective longitudinally extending conveyor sprocket shafts 24, 24. Mounted on each shaft 24 are the spaced sprocket wheels 25, 25 on which are engaged respective endless vertical sprocket chains 26, 26, the lower portions of the chains being engaged on respective spaced pairs of sprocket wheels mounted on longitudinal shafts journaled in bracket elements 26' mounted in compartments 27 and 27' provided at the forward end of tank 12.

The shafts 24 are drivingly connected to the motor 22 through suitable gearing and vertical sprocket chains 28 coupling the drive gearing associated with the shafts 24 to a worm gear shaft 29 driven by the electric motor 22.

Each pair of vertical endless sprocket chains 26, 26 is connected by spaced sets of connector elements, each set comprising a bar 29 and a saddle or channel-shaped member 30, as shown in Figure 8, whereby the bars 29 are adapted to receive the top supporting ears 31 of a honeycomb frame, shown in dotted view at 32 in Figure 8, and the channel elements 30 are adapted to receive the lower corner portions of the honeycomb frame 32, whereby to support the honeycomb frame transversely between the respective pairs of vertical conveyor sprocket chains 26, 26, and whereby said vertical sprocket chains 26 lower the honeycomb frame 32 onto the forward end of the longitudinal conveyor 18.

The upstanding supports 23 comprise inwardly convergent arms 33, 33 extending adjacent the respective associated endless sprocket chains 26, 26, the arms 33 being provided with downwardly and inwardly extending depending spring arms 34, which may comprise strips of resilient metal, adapted to yieldingly support the inner portions of the sprocket chains 26, 26, and to guide said sprocket chains vertically.

The upstanding supports 23 are connected by transversely extending horizontal cross bars 35, 35 spaced forwardly and rearwardly of the vertical conveyor chains 26, 26 and having secured thereto respective pairs of vertical angle bars 36 and 37 which are likewise secured to the inside surfaces of the respective tank walls 17 and 16, as shown in Figure 7. Secured to angle bars 36 are supporting collars 38, and secured to the angle bars 37 are supporting collars 39. Designated at 40, 40 are respective horizontal axes or transverse shafts extending through the collars 39 and received at their opposite ends in the collars 38, said shafts likewise extending through locking collars 41, 41 secured on the top edge of tank wall 16, as shown in Figure 7. Rotatably mounted on each shaft 40 are a pair of knife blade guide-supporting frames 45, 45, each frame 45 comprising a pair of collars 46, 46 connected to an angle bar 47. Rigidly secured to the angle bar 47, and hence to the collars 46, 46 are the respective outwardly extending, parallel, generally triangular blade-supporting plates 48, 48. Slidably mounted in suitable slots provided therefor in the plates 48, 48 are respective transversely extending knives 49, each knife 49 comprising an upwardly inclined transverse blade, the blades being arranged in opposed relationship, as shown in Figure 8, while being freely slidable transversely in their associated supporting plates 48, 48.

Each blade 49 is formed at its intermediate portion with an aperture 50 in which is loosely engaged the end of an actuating arm 51, the actuating arms being secured respectively to respective transverse shafts 52, 52 slidably mounted for transverse reciprocating movement in opposed pairs of supporting brackets 53, 53 mounted respectively on the top edges of the tank walls 16 and 17, as shown in Figure 7.

Mounted on a pair of supporting arms 58, 58 secured to wall 16 is a shaft 59 arranged parallel to the wall 16 and rotatably supported on suitable bearings 60, 60 provided on the arms 58, as shown in Figure 7. Secured to one end of shaft 59 is a longitudinally extending crank element 61 which is connected by a connecting rod member 62 to an end of one of the shafts 52, and secured to the opposite end of shaft 59 is a longitudinally extending crank rod element 61' which is connected by a connecting rod 62' to the end of the other transverse shaft member 52. The shaft 59 is driven from the motor 22 by suitable coupling means, including a sprocket wheel 63 mounted on the shaft between the bearings 60, 60, and engaged by a sprocket chain coupled by a suitable means, to a driving motor 22' mounted in the tank.

Secured on the shafts 40 adjacent the oposite ends of the respective frames 45 are the respective collars 64, each collar having a stop lug 65 engageable with the edge of the angle bar 47 of the associated frame 45, and provided with an apertured anchoring lug 66 in which is engaged one end of a biasing spring 67, the biasing spring surrounding the associated shaft 40 and being connected at its opposite end to the adjacent plate member 48, to bias the plate member downwardly. Since the biasing force of the spring 67 is transmitted to the shaft 40, through the angle bars 47, the stop lugs 65 and the collars 64, the shaft 40 must be secured against rotation, which is accomplished by the provision of suitable locking means in the collars 44, such as set screws 68. Secured to the end of each shaft 40 is a lever 69 which is employed to manually rotate the shaft 40 to adjust the innermost limiting positions of the frames 45.

As shown in Figure 8, the blade supporting plates 48 are provided with arcuately curved, upwardly diverging top edge portions 70, 70, whereby a honeycomb frame 32 may pass readily downwardly between the edges of the blade supporting plates and will exert a camming action on the respective frames 45, allowing said frames to be rotated sufficiently to permit the passage of the honeycomb frame 32 therebetween in a controlled position with respect to the oscillating knives 49.

As will be readily apparent from Figures 7 and 8, rotation of the shaft 59 produces reciprocation of the transverse shaft 62, which is transmitted to the knives 49 by the arms 51, causing said knives to reciprocate and to sever the ends of honeycombs carried in the frame 32 as the frame moves downwardly between the knives.

Secured on the upstanding supports 23 and extending transversely over the forward portion of tank 12 adjacent the knives 49 are respective electric heaters 70' including reflectors 71 directed toward the knives, whereby the knives are maintained at an elevated temperature, facilitating the removal of the wax end caps from the honeycomb as the honeycomb frame is moved downwardly between the knives.

Figure 2:
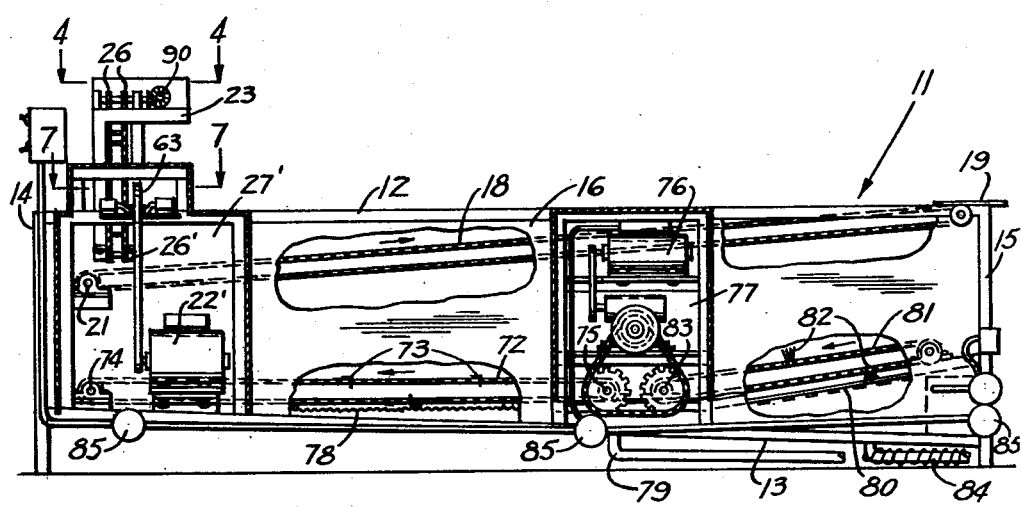
Figure 2 is a vertical cross sectional view taken on the line 2—2 of Figure 1.

Mounted in the lower portion of tank 12 and extending a substantial distance rearwardly is a longitudinal agitator belt 72 comprising sprocket chains connected by transversely extending scraping bars 73, the sprocket chains being engaged on sprockets mounted on respective transverse sprocket shafts 74 and 75 journaled in the lower portion of tank 12. The sprocket shaft 75 is suitably driven by an electric motor 76 mounted in a compartment 77 provided adjacent the intermediate portion of the tank 12, as shown in Figure 2.

A filter screen 78 of wire mesh, or the like, is mounted in the lower portion of the tank 12 subjacent the agitator belt 72, and whereby the transverse scraping bars 73 on the lower portion of the belt engage the screen 78, to move particles of wax, or similar undesired particles along the screen 78 in a rearward direction, while allowing the honey to pass through the screen and to flow along the sloping bottom wall 13 toward a honey drain conduit 79 connected to the intermediate portion of the bottom wall. Designated at 80 is a downwardly and forwardly inclined apertured panel which is secured in the lower portion of the tank 12 at its rear portion, as shown in Figure 2, the apertured panel 80 being disposed over the rear portion of the sloping bottom wall 13 of the tank. Designated at 81 is an endless belt which is mounted in the tank immediately over the apertured panel 80, said belt being provided with outwardly projecting brushes 82 engageable with the apertured panel 80 to scrape fragments of wax downwardly through the panel toward the rear portion of the sloping bottom wall 13. The endless belt 81 is driven by a sprocket shaft 83 which is drivingly coupled by suitable sprocket chains and by suitable gearing to the electric motor 76. The endless belts 72 and 81 are thus driven in the same direction of movement by the electric motor 76, the scraping bars 73 of the endless belt 72 engaging the screen 78 and moving rearwardly, whereas the brush elements 82 on the lower portion of the endless belt 81 engage the apertured panel 80 and move forwardly.

Connected to the rear portion of bottom wall 13 is a heated conduit 84 adapted to drain off the melted wax and honey accumulating in the rear portion of the tank 12. The clear honey is drained off through the drain conduit 79, as above explained.

Suitable heating means is provided for maintaining the tank 12 at an elevated temperature, for example, spaced electric heaters 85 located at suitable positions along the tank and being adapted to develop sufficient heat to maintain the honey in a free-flowing condition at all times. The moving parts inside the tank are thus continuously lubricated by the honey and require no additional lubrication.

In operation, the frames of honey are inserted between the vertical conveyor chains 26, 26, in the manner above described, by engaging the ears 31 of the frames on the conveyor bars 29 and allowing the lower corner portions of the frame to rest on the channel-shaped bars 30. The frames are moved downwardly between the reciprocating knives 49, whereby the wax end caps are removed from the honeycomb, allowing the honey to flow downwardly into the tank 12 as the frames are deposited on the chains of the longitudinal conveyor 18. The honey flows downwardly into the tank and is cleared by the action of the agitating belt 72, eventually passing into the drain conduit 79. A certain amount of honey and wax particles passes to the rear portion of the tank 12 and is engaged by the belt 81, the brush elements 82 of said belt causing the honey wax particles to be forced through the apertured panel 80 into the lower rear portion of tank 12, wherein the wax is melted and the melted wax and honey are drained from the tank through the heated conduit 84.

Figure 3:
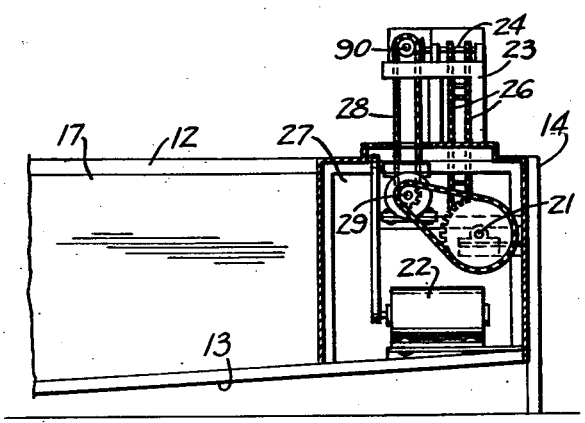
Figure 3 is a fragmentary vertical cross sectional view taken on the line 3—3 of Figure 1.

As above explained, a separate compartment 77 is provided for the driving motor 76 and the gearing associated therewith, for coupling the motor to the agitating belt 72 and the brushing belt 81. Similarly, it will be understood that separate compartments are provided respectively for the motors 22 and 22', the motor 22 being located in the compartment 27, as above explained, and the motor 22' being located in a similar compartment 27' located on the side of the tank opposite the compartment 27. The vertical conveyor chains 26, 26 operate in synchronism, said chains being simultaneously driven by a common transverse shaft 90 journaled on the top edges of the walls 16 and 17 and coupled by suitable beveled gearing to the respective conveyor drive shafts 24, 24. The shaft 90 is drivingly connected to the motor 22, as by a sprocket chain 28 and associated gearing and sprocket coupling means, as is shown clearly in Figure 3.

While a specific embodiment of an improved honeycomb uncapping machine has been disclosed in the fore-

What is claimed is:

1. A honey uncapping machine, comprising a honey collecting tank having a forward end and a rear end, a conveyor positioned within said tank adjacent the upper end thereof and extending longitudinally of said tank from the forward end to the rear end, a vertically disposed conveyor means positioned transversely of said conveyor and having the lower end adjacent to and spaced above the portion of said conveyor contiguous to the forward end of said tank and having the upper end exteriorly of and spaced above the upper end of said tank, opposed spaced means on said conveyor means for respectively receiving the opposite top supporting ears of a honeycomb frame and the lower corner portions of said frame, a knife blade guide supporting frame arranged on each side of and parallel to said conveyor means and each movable toward and away from said conveyor means, a pair of spaced blade supporting plates carried by each of said guide supporting frames, a knife extending between and mounted in each of said pairs of blade supporting plates for reciprocating movement, said knives being positioned in opposed relation with respect to each other, and means operatively connected to said knives for effecting the reciprocating movement of the latter to sever the wax ends of a honeycomb frame as it is being lowered by said vertical conveyor means toward said conveyor.

2. A honey uncapping machine, comprising a honey collecting tank having a forward end and a rear end, a conveyor positioned within said tank adjacent the upper end thereof and extending longitudinally of said tank from the forward end to the rear end, a vertically disposed conveyor means positioned transversely of said conveyor and having the lower end adjacent to and spaced above the portion of said conveyor contiguous to the forward end of said tank and having the upper end exteriorly of and spaced above the upper end of said tank, opposed spaced means on said conveyor means for respectively receiving the opposite top supporting ears of a honeycomb frame and the lower corner portions of said frame, a knife blade guide supporting frame arranged on each side of and parallel to said conveyor means and each movable about a horizontal axis toward and away from said conveyor means, a pair of spaced blade supporting plates carried by each of said guide supporting frames, a knifed extending between and mounted in each of said pairs of blade supporting plates for reciprocating movement, said knives being positioned in opposed relation with respect to each other, and means operatively connected to said knives for effecting simultaneously the reciprocating movement of the latter to sever the wax ends of a honeycomb frame as it is being lowered by said vertical conveyor means toward said conveyor.

3. A honeycomb uncapping machine comprising a honey collecting tank having a forward end and a rear end, a conveyor positioned within said tank adjacent the upper end thereof and extending longitudinally of said tank from the forward end to the rear end, a vertically disposed conveyor means positioned transversely of said conveyor and having the lower end adjacent to and spaced above the portion of said conveyor contiguous to the forward end of said tank and having the upper end exteriorly of and spaced above the upper end of said tank, opposed spaced means embodying a cross bar and a channel-shaped member on said conveyor means for respectively receiving the opposite top supporting ears of a honeycomb frame and the lower corner portions of said frame, a knife blade guide supporting frame arranged on each side of and parallel to said conveyor means and each movable about a horizontal axis toward and away from said conveyor means, a pair of spaced blade supporting plates carried by each of said guide supporting frames, a knife extending between and mounted in each of said pairs of blade supporting plates for reciprocating movement, said knives being positioned in opposed relation with respect to each other, and means operatively connected to said knives for effecting the reciprocating movement of the latter to sever the wax ends of a honeycomb frame as it is being lowered by said vertical conveyor means toward said conveyor.

4. A honeycomb uncapping machine comprising a honey collecting tank having a forward end and a rear end, a conveyor positioned within said tank adjacent the upper end thereof and extending longitudinally of said tank from the forward end to the rear end, a vertically disposed conveyor means positioned transversely of said conveyor and having the lower end adjacent to and spaced above the portion of said conveyor contingous to the forward end of said tank and having the upper end exteriorly of and spaced above the upper end of said tank, opposed spaced means on said conveyor means for respectively receiving the opposite top supporting ears of a honeycomb frame and the lower corner portions of said frame, a knife blade guide supporting frame arranged on each side of and parallel to said conveyor means and each movable toward and away from said conveyor means, a pair of spaced blade supporting plates carried by each of said guide supporting frames, a knife extending between and mounted in each of said pairs of blade supporting plates for reciprocating movement, said knives being positioned in opposed relation with respect to each other, a heat reflector positioned adjacent to and facing each knife, and means operatively connected to said knives for effecting the reciprocating movement of the latter to sever the wax ends of a honeycomb frame as it is being lowered by said vertical conveyor means toward said conveyor.

References Cited in the file of this patent

UNITED STATES PATENTS

| 711,223 | Miller | Oct. 14, 1902 |
| 2,261,529 | Stoller | Nov. 4, 1941 |
| 2,580,397 | Bogenschutz | Jan. 1, 1952 |